(12) United States Patent
Lasserre et al.

(10) Patent No.: US 10,666,990 B2
(45) Date of Patent: May 26, 2020

(54) METHOD AND DEVICE FOR MATCHING COLORS BETWEEN COLOR PICTURES OF DIFFERENT DYNAMIC RANGE

(71) Applicant: INTERDIGITAL VC HOLDINGS, INC., Wilmington, DE (US)

(72) Inventors: Sebastien Lasserre, Thorigné Fouillard (FR); Fabrice Leleannec, Mouazé (FR); David Touze, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 30 days.

(21) Appl. No.: 15/546,646

(22) PCT Filed: Jan. 28, 2016

(86) PCT No.: PCT/EP2016/051740
§ 371 (c)(1),
(2) Date: Jul. 26, 2017

(87) PCT Pub. No.: WO2016/120354
PCT Pub. Date: Aug. 4, 2016

(65) Prior Publication Data
US 2018/0007392 A1 Jan. 4, 2018

(30) Foreign Application Priority Data

Jan. 30, 2015 (EP) .................................. 15305125
Jan. 30, 2015 (EP) .................................. 15305143

(51) Int. Cl.
*G06K 9/00* (2006.01)
*H04N 19/98* (2014.01)
(Continued)

(52) U.S. Cl.
CPC ........... *H04N 19/98* (2014.11); *H04N 19/117* (2014.11); *H04N 19/186* (2014.11); *H04N 19/85* (2014.11);
(Continued)

(58) Field of Classification Search
None
See application file for complete search history.

(56) References Cited

U.S. PATENT DOCUMENTS

| 6,335,983 B1 | 1/2002 | McCarthy et al. |
| 7,558,436 B2 | 7/2009 | Zuro |

(Continued)

FOREIGN PATENT DOCUMENTS

| CN | 103327323 A | 9/2013 |
| CN | 104041036 A | 9/2014 |

(Continued)

OTHER PUBLICATIONS

Mantiuk et al., "Backward Compatible High Dynamic Range MPEG Video Compression", ACM Transactions on Graphics, vol. 25, No. 3, Jul. 2006, pp. 713-723.

(Continued)

*Primary Examiner* — Stephen P Coleman
(74) *Attorney, Agent, or Firm* — Lily Neff

(57) ABSTRACT

A method is disclosed that comprises mapping a high-dynamic range luminance picture to a standard-dynamic range luminance picture based on a backlight value $Ba_c$ associated with the high-dynamic range luminance picture.

25 Claims, 8 Drawing Sheets

(51) Int. Cl.
*H04N 19/186* (2014.01)
*H04N 19/85* (2014.01)
*H04N 19/117* (2014.01)

(52) U.S. Cl.
CPC .............. *G09G 2320/0271* (2013.01); *G09G 2340/0428* (2013.01); *G09G 2340/06* (2013.01); *G09G 2360/16* (2013.01)

(56) References Cited

U.S. PATENT DOCUMENTS

| | | |
|---|---|---|
| 2005/0152597 A1 | 7/2005 | Spaulding et al. |
| 2008/0175495 A1 | 7/2008 | Segall |
| 2010/0103200 A1 | 4/2010 | Langendijk |
| 2013/0241931 A1 | 9/2013 | Mai et al. |
| 2014/0086321 A1 | 3/2014 | Efremov et al. |
| 2014/0341305 A1 | 11/2014 | Qu et al. |

FOREIGN PATENT DOCUMENTS

| | | |
|---|---|---|
| WO | WO2012122426 | 9/2012 |
| WO | WO2012142471 | 10/2012 |
| WO | WO2014077827 | 5/2014 |
| WO | NO 2014130343 A2 | 8/2014 |
| WO | WO2014128586 | 8/2014 |
| WO | WO2014204865 | 12/2014 |

OTHER PUBLICATIONS

Iwahashi et al., "Efficient Lossless Bit Depth Scalable Coding for HDR Images", 2012 Asia-Pacific Signal & Information Processing Association Annual Summit and Conference (APSIPA ASC), Hollywood, California, USA, Dec. 3, 2012, pp. 1-4.

Kwon et al., "Compensation of de-saturation effect in HDR imaging using a real scene adaptation model", Journal of Visual Communication and Image Representation, vol. 24, No. 6, Mar. 20, 2012, pp. 678-685.

Chae et al., "A Tone Compression Model for the Compensation of White Point Shift Generated from HDR Rendering", IEICE Transactions of Fundamentals of Electronics, Communications and Computer Sciences, vol. E95A, No. 8, Aug. 2012, pp. 1297-1301.

Pascale, D., "A Review of RGB Color Spaces . . . from xyY to R'G'B'", The BabelColor Company, Montreal, Canada, Oct. 2003, pp. 1-35.

Anonymous, "Parameters values for ultra-high definition television systems for production and international programme exchange", International Telecommunication Union, ITU-R Radiocommunication Sector of ITU, Recommendation ITU-R BT.2020-1, Jun. 2014, pp. 1-8.

Anonymous, "Parameter values for the HDTV standards for production and international programme exchange", International Telecommunication Union, ITU-R Radiocommunication Sector of ITU, Recommendation ITU-R BT.709-5, Apr. 2002, pp. 1-32.

Anonymous, "High Dynamic Range Electro-Optical Transfer Function of Mastering Reference Displays", SMPTE Standard, Document SMPTE ST 2084:2014, Aug. 16, 2014, pp. 1-14.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2013, pp. 1-317.

Yun et al., "Color Correction for High Dynamic Range Images Using a Chromatic Adaptation Method", Optical Review, vol. 20, No. 1, Feb. 2013, pp. 65-73.

Kim et al., "Separate Color Correction for Tone Compression in HDR Image Rendering", IEICE Transactions on Fundamentals of Electronics, Communications and Computer Sciences, vol. E96-A, No. 8 Aug. 2013, pp. 1752-1758.

METHOD AND DEVICE FOR MATCHING COLORS BETWEEN COLOR PICTURES OF DIFFERENT DYNAMIC RANGE

This application claims the benefit, under 35 U.S.C. § 365 of International Application PCT/EP2016/051740, filed Jan. 28, 2016, which was published in accordance with PCT Article 21(2) on Aug. 4, 2016, in English, and which claims the benefit of European Patent Application 15305125.5, filed Jan. 30, 2015 and of European Patent Application 15305143.8, filed Jan. 30, 2015.

FIELD

The present disclosure generally relates to picture/video encoding and decoding. Particularly, but not exclusively, the technical field of the present disclosure is related to matching colors between color pictures of different dynamic range.

BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the following, a color picture contains several arrays of samples (pixel values) in a specific picture/video format which specifies all information relative to the pixel values of a picture (or a video) and all information which may be used by a display and/or any other device to visualize and/or decode a picture (or video) for example. A color picture comprises at least one component, in the shape of a first array of samples, usually a luma (or luminance) component, and at least one another component, in the shape of at least one other array of samples. Or, equivalently, the same information may also be represented by a set of arrays of color samples (color components), such as the traditional tri-chromatic RGB representation.

A pixel value is represented by a vector of c values, where c is the number of components. Each value of a vector is represented with a number of bits which defines a maximal dynamic range of the pixel values.

Standard-Dynamic-Range pictures (SDR pictures) are color pictures whose luminance values are represented with a limited dynamic usually measured in power of two or f-stops. SDR pictures have a dynamic around 10 fstops, i.e. a ratio 1000 between the brightest pixels and the darkest pixels in the linear domain, and are coded with a limited number of bits (most often 8 or 10 in HDTV (High Definition Television systems) and UHDTV (Ultra-High Definition Television systems) in a non-linear domain, for instance by using the ITU-R BT.709 OETF (Optico-Electrical-Transfer-Function) (*Rec. ITU-R BT.709-5, April* 2002) or ITU-R BT.2020 OETF (*Rec. ITU-R BT.2020-1, June* 2014) to reduce the dynamic. This limited non-linear representation does not allow correct rendering of small signal variations, in particular in dark and bright luminance ranges. In High-Dynamic-Range pictures (HDR pictures), the signal dynamic is much higher (up to 20 f-stops, a ratio one million between the brightest pixels and the darkest pixels) and a new non-linear representation is needed in order to maintain a high accuracy of the signal over its entire range. In HDR pictures, raw data are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A color gamut is a certain complete set of colors. The most common usage refers to a set of colors which can be accurately represented in a given circumstance, such as within a given color space or by a certain output device.

A color gamut is sometimes defined by RGB primaries provided in the CIE1931 color space chromaticity diagram and a white point, as illustrated in FIG. 1.

It is common to define primaries in the so-called CIE1931 color space chromaticity diagram. This is a two dimensional diagram (x,y) defining the colors independently on the luminance component. Any color XYZ is then projected in this diagram thanks to the transform:

$$\begin{cases} x = \dfrac{X}{X+Y+Z} \\ y = \dfrac{X}{X+Y+Z} \end{cases}$$

The $z=1-x-y$ component is also defined but carries no extra information.

A gamut is defined in this diagram by a triangle whose vertices are the set of (x,y) coordinates of the three primaries RGB. The white point W is another given (x,y) point belonging to the triangle, usually close to the triangle center. For example, W can be defined as the center of the triangle.

A color volume is defined by a color space and a dynamic range of the values represented in said color space.

For example, a color gamut is defined by a RGB ITU-R Recommendation BT.2020 color space for UHDTV. An older standard, ITU-R Recommendation BT.709, defines a smaller color gamut for HDTV. In SDR, the dynamic range is defined officially up to 100 nits (candela per square meter) for the color volume in which data are coded, although some display technologies may show brighter pixels.

High Dynamic Range pictures (HDR pictures) are color pictures whose luminance values are represented with a HDR dynamic that is higher than the dynamic of a SDR picture.

As explained extensively in "*A Review of RGB Color Spaces*" by Danny Pascale, a change of gamut, i.e. a transform that maps the three primaries and the white point from a gamut to another, can be performed by using a 3×3 matrix in linear RGB color space. Also, a change of space from XYZ to RGB is performed by a 3×3 matrix. As a consequence, whatever RGB or XYZ are the color spaces, a change of gamut can be performed by a 3×3 matrix. For example, a gamut change from BT.2020 linear RGB to BT.709 XYZ can be performed by a 3×3 matrix.

The HDR dynamic is not yet defined by a standard but one may expect a dynamic range of up to a few thousands nits. For instance, a HDR color volume is defined by a RGB BT.2020 color space and the values represented in said RGB color space belong to a dynamic range from 0 to 4000 nits. Another example of HDR color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamuts) or versions of the picture whose at least one of their colors has been altered/enhanced according to different color grades. This may involve user interactions.

For example, in cinematographic production, a picture and a video are captured using tri-chromatic cameras into RGB color values composed of 3 components (Red, Green and Blue). The RGB color values depend on the tri-chromatic characteristics (color primaries) of the sensor. A first color-graded version of the captured picture is then obtained in order to get theatrical renders (using a specific theatrical grade). Typically, the values of the first color-graded version of the captured picture are represented according to a standardized YUV format such as BT.2020 which defines parameter values for UHDTV.

The YUV format is typically performed by applying a non-linear function, so called Optical Electronic Transfer Function (OETF) on the linear RGB components to obtain non-linear components R'G'B', and then applying a color transform (usually a 3×3 matrix) on the obtained non-linear R'G'B' components to obtain the three components YUV. The first component Y is a luminance component and the two components U,V are chrominance components.

Then, a Colorist, usually in conjunction with a Director of Photography, performs a control on the color values of the first color-graded version of the captured picture by fine-tuning/tweaking some color values in order to instill an artistic intent.

A problem to be solved is the distribution of a compressed HDR picture (or video) while, at the same time, distributing an associated SDR picture (or video) representative of a color-graded version of said HDR picture (or video).

A trivial solution is simulcasting both SDR and HDR picture (or video) on a distribution infrastructure but the drawback is to virtually double the needed bandwidth compared to a legacy infrastructure distributing adapted to broadcast SDR picture (or video) such as HEVC main 10 profile ("*High Efficiency Video Coding*", SERIES H: AUDIOVISUAL AND MULTIMEDIA SYSTEMS, Recommendation ITU-T H.265, Telecommunication Standardization Sector of ITU, April 2013).

Using a legacy distribution infrastructure is a requirement to accelerate the emergence of the distribution of HDR pictures (or video). Also, the bitrate shall be minimized while ensuring good quality of both SDR and HDR version of the picture (or video).

Moreover, backward compatibility may be ensured, i.e. the SDR picture (or video) shall be viewable for users equipped with legacy decoder and display, i.e. in particular, overall perceived brightness (i.e. dark vs. bright scenes) and perceived colors (for instance, preservation of hues, etc.) should be preserved.

Another straightforward solution is to reduce the dynamic range of the HDR picture (or video) by a suitable non-linear function, typically into a limited number of bits (say 10 bits), and directly compressed by the HEVC main10 profile. Such non-linear function (curve) already exist like the so-called PQ EOTF proposed by Dolby at SMPTE (*SMPTE standard: High Dynamic Range Electro-Optical Transfer Function of Mastering Reference Displays*, SMPTE ST 2084:2014).

The drawback of this solution is the lack of backward compatibility, i.e. the obtained reduced version of the picture (video) has not a sufficient visual quality to be considered as being viewable as a SDR picture (or video), and compression performance are somewhat poor.

The present disclosure has been devised with the foregoing in mind.

SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the abovementioned drawbacks with a method of matching colors between color pictures of different dynamic range according to an aspect of the present principles, characterized in that it comprises
  obtaining an input color gamut of an input color picture;
  obtaining an output color gamut of an output color picture; and
  modifying the output color gamut to match the input color gamut, wherein said modifying comprises calculating a reduced, e.g. minimized, perceived color error distance between the input color gamut and the output color gamut.

According to an embodiment, the perceived color error depends on a hue and a perceived saturation of said color gamuts.

According to an embodiment, the output color picture is a dynamic reduced version of the input color picture.

This may allow to have the input color picture being an HDR color picture and an SDR picture being a reshaped version of the HDR color picture such that the hue and perceived saturation are preserved and the visual quality of the SDR picture relative to the HDR picture is increased. The SDR picture may then, e.g., the encoded and stored or transmitted over a transmission medium.

According to another embodiment the output color picture is a dynamic expanded version of the input color picture. This may allow to have the input color picture being an SDR color picture, e.g., obtained from a storage or a bitstream from a transmission medium and obtaining an output color picture being a reshaped version of the SDR input picture.

According to an embodiment, the modifying comprises applying a multiplicative factor or scaling factor to chrominance components, each being in a shape of an array of chrominance samples, of the input color picture, the multiplicative factor depending on the reduced or minimized perceived color error.

In an example embodiment, the multiplicative factor or scaling factor depends on a luminance component, being in a shape of an array of luminance or luma samples, of the output color picture, i.e. for each set of chrominance samples of the chrominance components the assigned scaling factor depends on the co-located luminance sample of the output color picture (and the output luminance sample is a reshaped version of the input luminance of the corresponding co-located input luminance sample).

According to an embodiment, the multiplicative factor or scaling factor depends on a modulation value (also called backlight value) of the input color picture.

According to an embodiment, the input color gamut is defined as a finite set of points in an xy plane of a XYZ colorspace, such as the CIE 1931 color space.

In an example embodiment, perceptual weights are associated to said points such that the perceived color error distance is weighted by the perceptual weight at each point.

According to an embodiment, values of said multiplicative factor are provided in a look up table or other remote or local memory with respect to values of the luminance component of the output color picture.

In an example embodiment, for different backlight values of the input color picture dedicated look up tables or a combined look up table are provided.

In an example embodiment, a desired multiplicative factor associated with a dedicated backlight value is either read from the look up table or determined by interpolation between corresponding multiplicative factors associated with neighboring backlight values.

According to an embodiment, the perceived color error distance is based on the ab distance in the Lab colorspace.

According to other of its aspects, the disclosure relates to devices comprising a processor configured to implement the above methods, a computer program product comprising program code instructions to execute the steps of the above methods when this program is executed on a computer, a processor readable medium having stored therein instructions for causing a processor to perform at least the steps of the above methods, and a non-transitory storage medium carrying instructions of program code for executing steps of the above methods when said program is executed on a computing device.

The specific nature of the disclosure as well as other objects, advantages, features and uses of the disclosure will become evident from the following description of embodiments taken in conjunction with the accompanying drawings.

DESCRIPTION OF EMBODIMENTS

Figure 1:
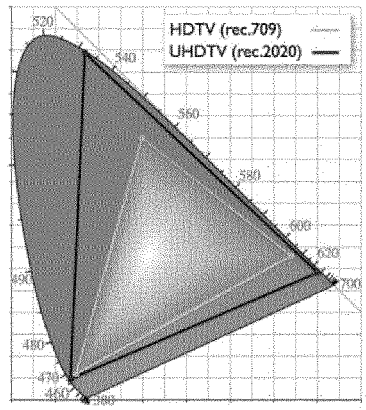
FIG. 1 shows examples of chromaticity diagrams.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

A color picture is considered as having three color components in which the pixel values of the color picture are represented. The present disclosure, although explained by way of concrete example, is not limited to any color space in which the three components are represented but extends to any color space such as RGB, CIELUV, XYZ, CIELab, etc.

In an embodiment, a factor (i.e a real value) depends on a modulation value Ba. A modulation (or backlight) value is usually associated with an HDR picture and is representative of the brightness of the HDR picture. Here, the term (modulation) backlight is used by analogy with TV sets made of a color panel, like a LCD panel for instance, and a rear illumination apparatus, like a LED array for instance. The rear apparatus, usually generating white light, is used to illuminate the color panel to provide more brightness to the TV. As a consequence, the luminance of the TV is the product of the luminance of rear illuminator and of the luminance of the color panel. This rear illuminator is often called "modulation" or "backlight" and its intensity is somewhat representative of the brightness of the overall scene.

Figure 2:
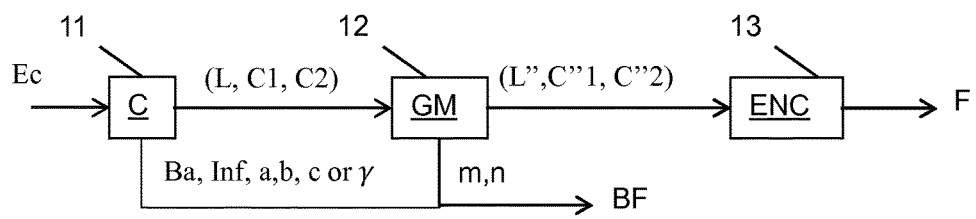
FIG. 2 shows schematically a diagram of the steps of a first example of a method of encoding a color picture.

FIG. 2 shows schematically a diagram of the steps of a first example of a method of encoding a color picture I.

In step 11, a module C obtains a luminance component L and two chrominance components C1 and C2 from a color picture I to be encoded. For instance the components (L, C1, C2) may belong to the YUV color space, obtained after applying an OETF on the color picture I, and the color components Ec may belong either to a linear RGB or XYZ color space.

In step 12, a module GM maps the luminance L and chrominance C1, C2 components onto a final luminance component L" and two final chrominance components C"1, C"2 in order that the gamut G2 of colors obtained from said final luminance (L") and chrominance (C"1, C"2) components maps onto the gamut G1 of the colors of the color picture I to be encoded.

Figure 3:
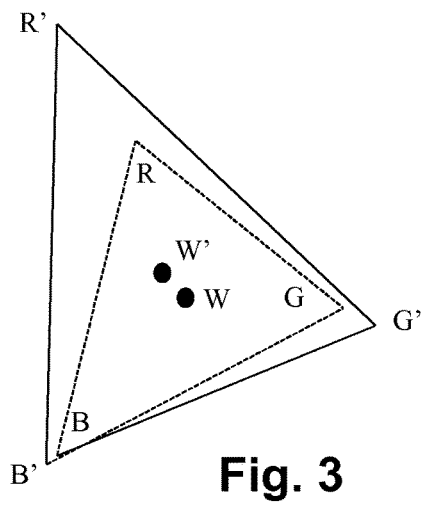
FIG. 3 illustrates the principle of a gamut mapping in accordance with the present disclosure.

FIG. 3 illustrates such a gamut mapping. In dashed line is represented the gamut (R,G,B,W) of the colors obtained from the component L and the two chrominance components C1 and C2 and in solid line the gamut (R', G', B', W') of the colors of the picture I to be encoded.

Mapping the gamut (R, G, B, W) onto the gamut (R', G', B', W') means mapping the primaries R, G, B to the primaries R', G', B' respectively and mapping the white point W to the white point W'. The purpose of the mapping is to transform (L, C1, C2) into (L", C"1, C"2) such that the perceived colors obtained from the L", C"1, C"2 components match the colors of the color picture I better than (L, C1, C2) do.

In step 13, an encoder ENC encodes the final luminance L" component and the two final chrominance components C"1, C"2.

According to an embodiment, the encoded component L" and chrominance components C"1, C"2 are stored in a local or remote memory and/or added into a bitstream F.

Figure 4:
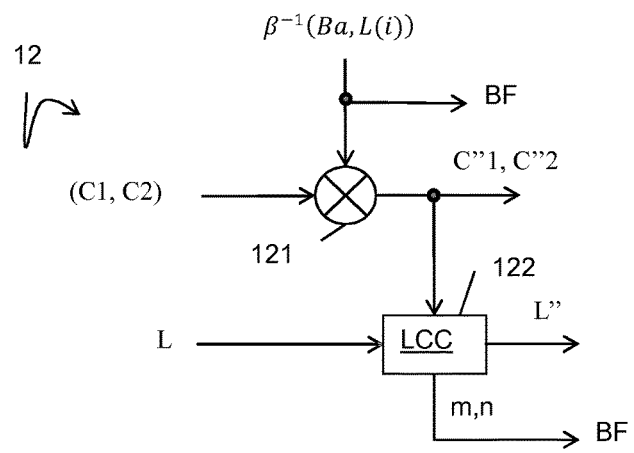
FIG. 4 shows schematically a diagram of the sub-steps of the step 12.

According to an embodiment of the step 12, illustrated in FIG. 4, the two final chrominance components C"1, C"2 are obtained by scaling (step 121) each of the two chrominance components C1, C2 by a factor $\beta^{-1}(Ba,L(i))$ that depends on both a modulation value Ba, obtained from the luminance component L, and the value of each pixel i of the luminance component L, and a module LCC (step 122) obtains the final luminance component L" by linearly combining together the luminance component L and the two final chrominance components C"1, C"2:

$$\begin{cases} L'' = L - mC_1'' - nC_2'' \\ C_1'' = \beta^{-1}(Ba, L(i)) * C_1 \\ C_2'' = \beta^{-1}(Ba, L(i)) * C_2 \end{cases} \quad (A)$$

where m and n are coefficients (real values) that avoid color saturation by correcting the highest luminance peaks.

According to an embodiment, the coefficients m and n are stored in either a local or remote memory and/or added to a bitstream BF as illustrated in FIG. 4.

According to a variant of the module LCC (of equation A), the values of the final luminance component L" are always lower than the values of the luminance component L:

$$L''=L-\max(0,mC_1'+nC_2')$$

This ensures that the values of the final luminance component L" do not exceed the values of the luminance component L and thus ensures that no color saturation occurs.

Figure 5:
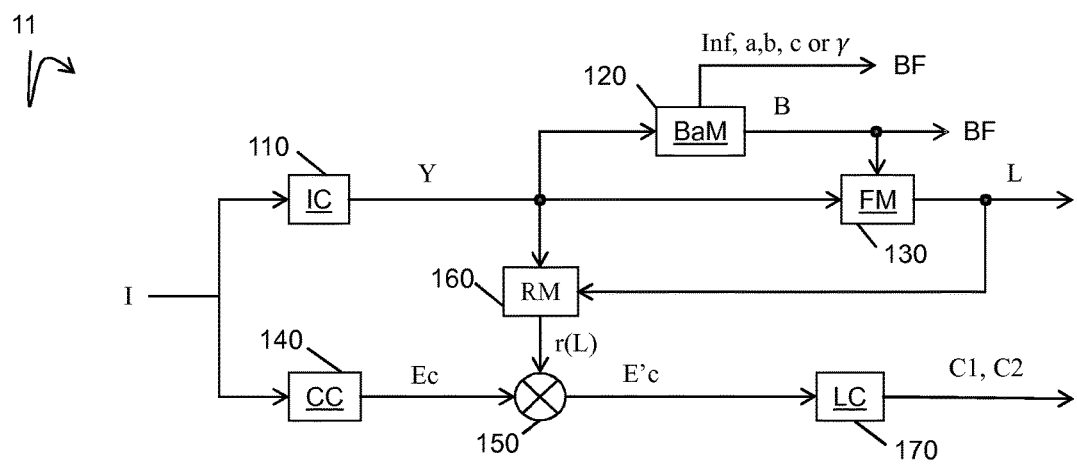
FIG. 5 shows schematically a diagram of the sub-steps of the step 11.

According to an embodiment of the step 11, illustrated in FIG. 5, in step 110, a module IC obtains a component Y that represents the luminance of the color picture I by linearly combining together the three components Ec:

$$Y = A_1 \begin{bmatrix} E_1 \\ E_2 \\ E_3 \end{bmatrix}$$

where A1 is the first row of a 3×3 matrix A that defines a color space transforms from the (E1, E2, E3) color space to a color space (Y, C1, C2).

In step 130, a module FM obtains the luminance component L by applying a non-linear function f on the component Y:

$$L=f(Ba,Y) \quad (1)$$

where Ba is a modulation value obtained from the component Y by the module BaM (step 120).

Applying the non-linear function f on the component Y reduces its dynamic range. In other terms, the dynamic of the luminance component L is reduced compared to the dynamic of the component Y.

Basically the dynamic range of the component Y is reduced in order that the luminance values of the component L are represented by using 10 bits.

According to an embodiment, the component Y is divided by the modulation value Ba before applying the non-linear function f:

$$L = f(Y/Ba) \quad (2)$$

According to an embodiment, the non-linear function f is a gamma function:

$$L = B \cdot Y_1^\gamma$$

where $Y_1$ equals either Y or Y/Ba according to the embodiments of eq. (1) or (2), B is a constant value, γ is a parameter (real value strictly below 1).

According to an embodiment, the non-linear function f is a S-Log function:

$$L = a \cdot \ln(Y_1 + b) + c$$

where a, b and c are parameters (real values) of a SLog curve determined such that f(0) and f(1) are invariant, and the derivative of the SLog curve is continuous in 1 when prolonged by a gamma curve below 1. Thus, a, b and c are functions of the parameter γ.

Typical values are shown in Table 1.

TABLE 1

| γ | a | B | c |
|---|---|---|---|
| 1/2.0 | 0.6275 | 0.2550 | 0.8575 |
| 1/2.4 | 0.4742 | 0.1382 | 0.9386 |
| 1/2.8 | 0.3861 | 0.0811 | 0.9699 |

In an advantageous embodiment, a value of γ close to 1/2.5 is efficient in terms of HDR compression performance as well as good viewability of the obtained SDR luma. Thus, the 3 parameters may advantageously take the following values: a=0.44955114, b=0.12123691, c=0.94855684.

According to an embodiment, the non-linear function f is either a gamma correction or a SLog correction according to the pixel values of the component Y.

Applying a gamma correction on the component Y, pulls up the dark regions but does not lower enough high lights to avoid burning of bright pixels.

Then, according to an embodiment, the module FM applies either the gamma correction or the SLog correction according to the pixel values of the component Y. An information data Inf may indicate whether either the gamma correction or Slog correction applies.

For example, when the pixel value of the component Y is below a threshold (equal to 1), then the gamma correction is applied and otherwise the SLog correction is applied.

According to an embodiment of the step 120, the modulation value Ba is an average, median, min or max value of the pixel values of the component Y. These operations may be performed in the linear HDR luminance domain $Y_{lin}$ or in a non-linear domain like ln(Y) or $Y^\gamma$ with γ<1.

According to an embodiment, when the method is used to encode several color pictures belonging to a sequence of pictures, a modulation value Ba is determined for each color picture, a Group of Pictures (GOP) or for a part of a color picture such as, but not limited to, a slice or a Transfer Unit as defined in HEVC.

According to an embodiment, the value Ba and/or the parameters of the non-linear function f (such as a, b, c or γ) and/or the information data Inf is (are) stored in a local or remote memory and/or added into a bitstream BF as illustrated in FIGS. 2 and 5.

In step 140, a module CC obtains at least one color component EC (c=1, 2, 3) from the color picture I. A color component Ec may be obtained directly from a local or a remote memory or by applying a color transform on the color picture I.

In step 150, an intermediate color component E'c (c=1, 2 or 3) is obtained by scaling each color component Ec by a factor r(L) that depends on the luminance component L:

$$\begin{cases} E'_1(i) = E_1(i) * r(L(i)) \\ E'_2(i) = E_2(i) * r(L(i)) \\ E'_3(i) = E_3(i) * r(L(i)) \end{cases}$$

where r(L(i)) is a factor (real value), determined by the module RM (step 160), that depends on the value of a pixel i of the component L, $E_c'(i)$ is the value of the pixel i of the intermediate color component E'c, and $E_c(i)$ is the value of the pixel i of the color component Ec.

Scaling by a factor means multiplying by said factor or dividing by the inverse of said factor.

Scaling each color component Ec by the factor r(L) that depends on the luminance component L preserves the hue of the colors of the color picture I.

According to an embodiment of the step 160, the factor r(L) is the ratio of the luminance component L over the component Y:

$$r(L(i)) = \frac{L(i)}{Y(i)}$$

with Y(i) being the value of a pixel i of the component Y. Actually, the value Y(i) of a pixel of the component Y depends non-ambiguously on the value L(i) of a pixel of the luminance component L, such that the ratio can be written as a function of L(i) only.

This embodiment is advantageous because scaling each color component Ec by the factor r(L) that further depends on the component Y preserves the hue of the colors of the color picture I and thus improves the visual quality of the decoded color picture.

More precisely, in colorimetry and color theory, colorfulness, chroma, and saturation refer to the perceived intensity of a specific color. Colorfulness is the degree of difference between a color and gray. Chroma is the colorfulness relative to the brightness of another color that appears white under similar viewing conditions. Saturation is the colorfulness of a color relative to its own brightness.

A highly colorful stimulus is vivid and intense, while a less colorful stimulus appears more muted, closer to gray. With no colorfulness at all, a color is a "neutral" gray (a picture with no colorfulness in any of its colors is called grayscale). Any color can be described from its colorfulness (or chroma or saturation), lightness (or brightness), and hue.

The definition of the hue and saturation of the color depends on the color space used to represent said color.

For example, when a CIELUV color space is used, the saturation $s_{uv}$ is defined as the ratio between the chroma $C_{uv}^*$ over the luminance L*.

$$s_{uv} = \frac{C_{uv}^*}{L^*} = \frac{\sqrt{u^{*2} + v^{*2}}}{L^*}$$

The hue is then given by $$h_{uv} = \arctan\frac{v^*}{u^*}$$

According to another example, when a CIELAB color space is used, the saturation is defined as the ratio of the chroma over the luminance:

$$s_{ab} = \frac{C^*_{ab}}{L^*} = \frac{\sqrt{a^{*2}+b^{*2}}}{L^*}$$

The hue is then given by $$h_{ab} = \arctan\frac{b^*}{a^*}$$

These equations are a reasonable predictor of saturation and hue that are in agreement with the human perception of saturation, and demonstrate that adjusting the brightness in CIELAB (or CIELUV) color space while holding the angle a*/b* (or u*/v*) fixed does affect the hue and thus the perception of a same color. In step 150, scaling the color components Ec by a same factor preserves this angle, thus the hue.

Now let us consider that the color picture I is represented in the CIELUV color space and a picture 12 that is formed by combining together the luminance component L, whose dynamic range is reduced compared to the dynamic range of the luminance of the color picture I (step 130), and two chrominance components U (=C1) and V (=C2) of the CIELUV color space. The colors of the picture 12 are thus differently perceived by a human being because the saturation and the hue of the colors changed. The method (step 150) determines the chrominance components C1 and C2 of the picture 12 in order that the hue of the colors of the picture I2 best match the hue of the colors of the color picture I.

According to an embodiment of the step 160, the factor r(L) is given by:

$$r(L(i)) = \frac{\max\{5, L(i)\}}{2048\max\{0.01, Y(i)\}}$$

This last embodiment is advantageous because it prevents the factor from going to zero for very dark pixels, i.e. allows the ratio to be invertible regardless of the pixel value.

In step 170, the two chrominance components C1, C2 are obtained from said at least one intermediate color components E'c.

Figure 6:
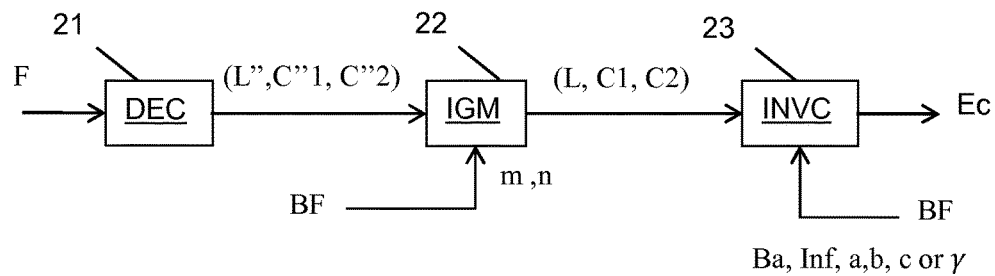
FIG. 6 shows schematically a diagram of the steps of a first example of a method of decoding a color picture from at least one bitstream.

FIG. 6 shows schematically a diagram of the steps of a method of decoding a color picture from at least a bitstream in accordance with an embodiment of the disclosure.

In step 21, a decoder DEC obtains a luminance component L" and two chrominance components C"1, C"2 either from a local or remote memory or by decoding at least partially a bitstream F.

In step 22, a module IGM obtains a final luminance component L and two final chrominance components C1, C2 from said luminance L" and chrominance C"1, C"2 components by applying an inverse mapping on the colors obtained from said luminance L" and chrominance C"1, C"2 components.

In step 23, a module INVC obtains at least one color component Ec of the color picture to be decoded from said final luminance L component and said two final chrominance C1, C2 components. The decoded picture being obtained by combining together said at least one color component Ec.

Figure 7:
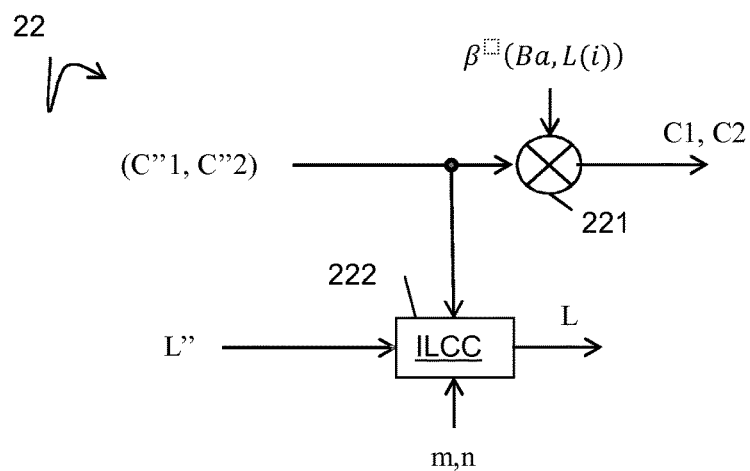
FIG. 7 shows schematically a diagram of the sub-steps of the step 22.

According to an embodiment of the step 22, illustrated in FIG. 7, a module ILCC obtains (step 222) the final luminance component L by linearly combining together the luminance component L" and the two chrominance components C"1, C"2, and the two final chrominance components C1, C2 are obtained by scaling (step 221) each of the two chrominance components C"1, C"2 by a factor β (Ba,L(i)) that depends on both a modulation value Ba and the value of each pixel i of the final luminance component L, and:

$$\begin{cases} L = L'' + mC''_1 + nC''_2 \\ C_1 = \beta(Ba, L(i)) * C''_1 \\ C_2 = \beta(Ba, L(i)) * C''_2 \end{cases} \quad (J)$$

where m and n are coefficient (real values). The coefficients m and n may be those obtained by the factorization of the matrix $\Phi_{Ba}(L)$, i.e. m and n are those obtained in $\Phi_0$. Consequently, they depend on the gamut of the color picture I (for instance BT.709 or BT.2020 gamut). Typical values for m and n are m≈n in the interval [0.1, 0.5]

Equation (J) is considered as being an inverse mapping applies on the colors obtained from the luminance L" and chrominance C"1, C"2 components. Equation (J) is directly obtained from equation (A) that is considered as being a color mapping.

According to a variant of the module ILCC, the values of the final luminance component L are always higher than the values of the luminance component L":

$$L=L''+\max(0, mC_1'+nC_2')$$

This embodiment is advantageous because it ensures that the final luminance component L does not exceed a potential clipping value that is usually used by the decoder to define a luminance peak. When a luminance peak is required by a decoder and when the final luminance component L is given by equation (J), the final luminance component L is clipped introducing some artefacts.

According to an embodiment, the modulation value Ba and/or the coefficients m and n are obtained from a remote or local memory such a Look-Up-Table, or from a bitstream BF as illustrated in FIG. 7.

According to an embodiment, the factor $\beta^{-1}(Ba,L(i))$ is obtained from a Look-Up-Table (LUT) for a specific modulation value Ba and a specific value L(i) of the final luminance component L. Thus, for multiple luminance peak values such as for example, 1000, 1500 and 4000 nits, a specific factor $\beta^{-1}(Ba,L(i))$ is stored in a LUT for each specific modulation value Ba.

According to a variant, the factor $\beta^{-1}(Ba,L(i))$ for a specific modulation value Ba is obtained for a value of a pixel of the final luminance component L by interpolating the luminance peaks between the multiple luminance peaks for which LUT are stored.

Figure 8:
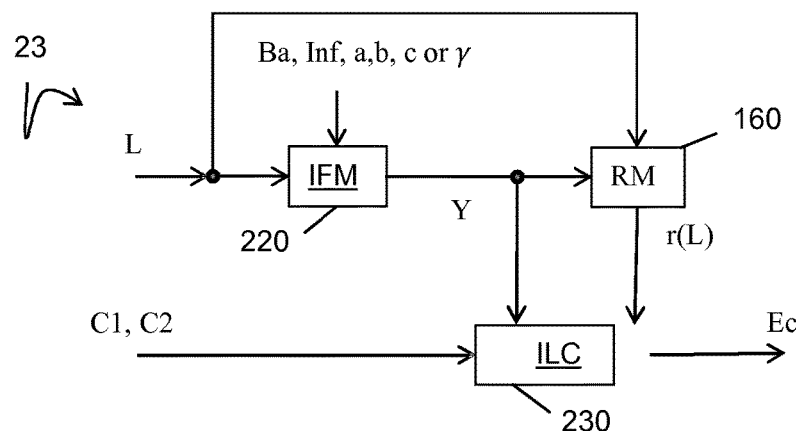
FIG. 8 shows schematically a diagram of the sub-steps of the step 23.

According to an embodiment of the step 23, illustrated in FIG. 8, in step 220, a module IFM obtains a first component Y by applying a non-linear function $f^{-1}$ on the final luminance component L in order that the dynamic of the first component Y is increased compared to the dynamic of the final luminance component L:

$$Y=f^{-1}(Ba,L) \qquad (A3)$$

The non-linear function $f^{-1}$ is the inverse of the non-linear function f (step 130).

Thus, the embodiments of the function $f^{-1}$ are defined according to the embodiments of the function f.

According to an embodiment, the parameters of the non-linear function $f^{-1}$ (such as a, b, c or γ) and/or the information data Inf is (are) obtained from a local or remote memory (for example a Look-Up-Table) and/or from a bitstream BF as illustrated in FIG. 8.

According to an embodiment, the luminance component L is multiplied by the modulation value Ba after having applied the non-linear function $f^{-1}$:

$$Y=Ba*f^{-1}(L) \qquad (A4)$$

According to an embodiment, the non-linear function $f^{-1}$ is the inverse of a gamma function.

The component Y is then given by:

$$Y_1 = \frac{L^{1/\gamma}}{B}$$

where $Y_1$ equals Y or Y/Ba according to the embodiments of eq. (A3) or (A4), B is a constant value, γ is a parameter (real value strictly below 1).

According to an embodiment, the non-linear function $f^{-1}$ is the inverse of a S-Log function. The component $Y_1$ is then given by:

$$Y_1 = \exp^{\left(\frac{L-c}{a}\right)} - b$$

According to an embodiment, the non-linear function f is the inverse of either a gamma correction or a SLog correction according to the pixel values of the component Y. This is indicated by the information data Inf.

In step 230, a module ILC obtains at least one color component Ec from the first component Y, the two final chrominance components C1, C2, and from a factor r(L) that depends on the final luminance component L. The decoded color picture is then obtained by combining together said at least one color component Ec.

Figure 9:
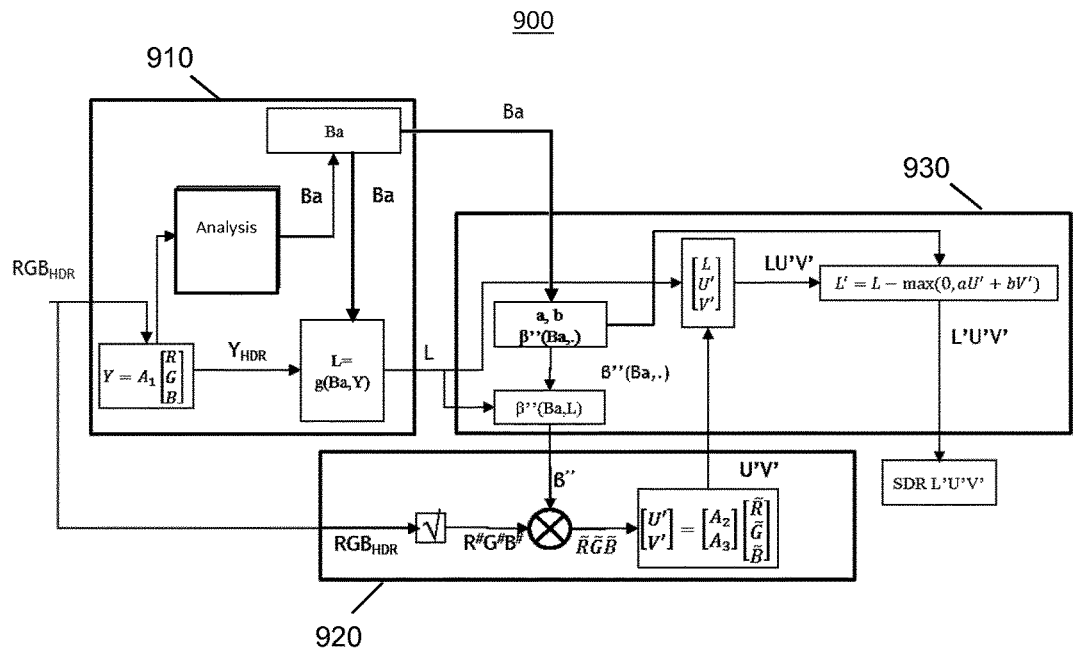
FIG. 9 shows schematically a diagram of the steps of a second example of a method of encoding a color picture.
Figure 10:
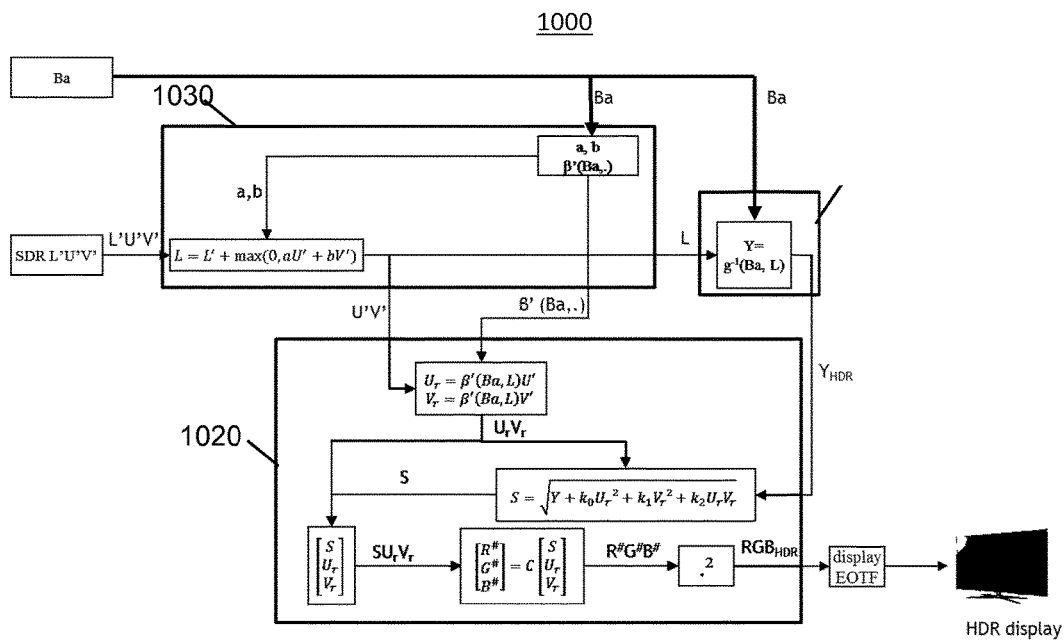
FIG. 10 shows schematically a diagram of the steps of a second example of a method of decoding a color picture from at least one bitstream.

Referring now to FIG. 9 and FIG. 10, a second example of a generic encoding scheme (encoder and decoder) is illustrated that depends mainly on a set of two-variable functions β"(Ba,L), β'(Ba,L) and g(Ba,L) and of two constant parameters a and b that are used for the mapping from HDR to SDR of the luminance and the chrominance such that colors, as well as texture, are preserved in the SDR image/video compared to the original HDR image/video. While g(Ba,L) is preferably a Slog function in the variable L, the triplet (a, b, β") should be optimized to lead to the best possible SDR/HDR color matching (hue and perceived saturation) depending on the peak luminance, the input/output gamut's, and the backlight value Ba.

The encoding involves the function β"(Ba,L), and the decoding involves the function β'(Ba,L).

Referring to FIG. 9, a diagram illustrating steps of an example of a method of encoding 900 a color picture is schematically shown. The encoder side processing steps are summarized as follows. In a first step 910, a luminance dynamic reduction is performed to get L as a dynamic reduced version of an input high dynamic range luminance $Y=Y_{HDR}$, in the shown example obtained from an input $RGB_{HDR}$ image. In the shown example, a reduction of the HDR luminance $Y_{HDR}$ dynamic is performed to get a luma $L=L_{SDR}$, for example on 10 bits, wherein $L=L_{SDR}=g(Y_{HDR})$ with g being a non-linear function used to compress the dynamic. In the shown embodiment, the function g may also depend on the backlight value Ba, in the shown example being derived from analyzing the input luminance.

In a second step 920, a construction of two dynamic reduced chroma components is performed, U'V' in the shown example. This completes $L_{SDR}$ such that a SDR picture or video with three components is obtained, $L_{SDR}$ UV in the shown example, wherein $R^\#B^\#G^\#$ are determined as the square root of $RGB_{HDR}$ and $\tilde{R}\tilde{G}\tilde{B}$ are the normalization of $R^\#B^\#G^\#$ by a common multiplicative factor β". Here, β"($L_{SDR}$) is a given function depending at least on $L_{SDR}$. In the shown example, the two chroma components U' V' are determined as $[U'; V']=\text{Mat}_{2\times 3} [\tilde{R}; \tilde{G}; \tilde{B}]$ in where the matrix is a 2×3 matrix.

In a third step 930, a correction of the color components by a gamut mapping is performed, here from LU'V' to L'U"V". In the shown example, a gamut mapping from the SDR space $LUV_{SDR}$ with incorrect hues and saturations to the corrected space $L'U'V'_{SDR}$ is carried out that preserves HDR colors better. In the shown example [L'; U"; V"]=$\text{Mat}_{3\times 3}$(L) [L; U'; V'].

Referring to FIG. 10, a diagram illustrating steps of an example of a corresponding method of decoding 1000 a color picture is schematically shown. The decoder side processing steps are summarized as follows.

In a first step 1030, which may be considered an inverse of corresponding third step 930 shown in FIG. 9, a correction of the color components back to LU'V' from L'U"V" by a gamut de-mapping is performed. In the shown example, [L; U"; V']=$\text{Mat}_{3\times 3}$ [L'; U"; V"] is determined.

In a second step 1010, which may be considered an inverse of corresponding first step 910 shown in FIG. 9, a luminance dynamic expansion is performed to get Y back, i.e. for the shown example $Y_{HDR}=f^{-1}(L_{SDR})$.

In a third step 1020, which may be considered an inverse of corresponding second step 920 shown in FIG. 9, $RGB_{HDR}$ are recovered from YU'V'. This includes a re-normalization of U'V' into $U_r, V_r$ by a common multiplicative factor β' and the determination of a value S by $S=\sqrt{Y+k_0U_r^2+k_1V_r^2+k_2U_rV_r}$. In the shown example, $R^\#$, $G^\#$ and $B^\#$ are determined as $[R^\#;G^\#;B^\#]=\text{Mat}_{3\times 3} [S;U_r;V_r]$ and $RGB_{HDR}$ is obtained as the square of $R^\#G^\#B^\#$.

By construction, in order to get a decoder that is the exact inverse of the encoder, one must take β'=1/β". As a consequence, for a given couple (a,b), the determination of β" is sufficient to define both the encoder end the decoder.

The problem to solve is to find β" such that SDR L'U"V" colors correspond at best to the input HDR colors (hue and perceived saturation) and the process is decodable, i.e. the scaling by β" avoids clipping in U"V" as best as possible.

Figure 11:
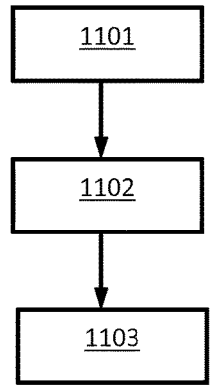
FIG. 11 shows schematically a diagram of the steps of a method for matching colors between color pictures of different dynamic range in accordance with an embodiment of the disclosure.

Referring to FIG. 11, a method for matching colors between color pictures of different dynamic range in accordance with an embodiment of the disclosure is schematically shown. The method comprises obtaining an input color gamut of an input color picture 1101, obtaining an output color gamut of an output color picture 1102, and modifying 1103 the output color gamut to match the input color gamut, wherein the modifying comprises calculating a reduced, e.g. minimized, perceived color error distance between the input color gamut and the output color gamut.

Figure 12:
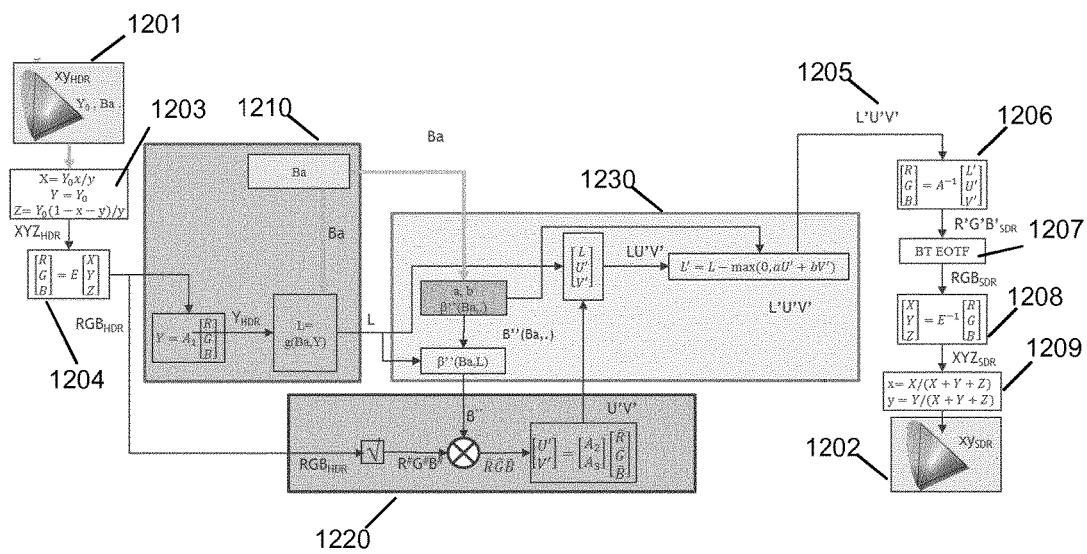
FIG. 12 shows schematically a diagram of the steps of a method for matching colors between color pictures of different dynamic range in accordance with another embodiment of the disclosure.

The minimization will be explained, by way of example, with reference to the embodiment shown in FIG. 12, where the output color picture is an SDR version of an HDR input color picture at an input of a encoder mainly corresponding to an encoding described with reference to FIG. 9. Therefore, a detailed description of the corresponding encoding steps 1210, 1220, 1230 is omitted and the description focusses on the optimization problem.

An optimization of β" is performed such that the distance between an input HDR gamut 1201 and the output associated SDR gamut 1202 is minimized in terms of perceived color distortion or error. To do so, one must define precisely the notion of gamut, the image of a gamut by the codec, and the distance between two gamuts.

For solving the the minimization problem, the following parameters are fixed: the backlight Ba, the matrix of the [L'; U"; V"]=Mat$_{3\times3}$(L) [L; U'; V'], i.e. the two parameters (a,b), and a luminance level $Y_0$.

An optimized β", i.e. β"(Ba,$L_0$,a,b), value is then deduced that minimizes the distance between an input HDR gamut at luminance $Y_0$ and an output SDR gamut at luma $L_0$=f($Y_0$).

The input HDR gamut is given by (x,y) points in the 2D gamut triangle (BT709 or BT2020 triangle for instance) and a luminance $Y_0$. In variants, another space may be used to describe the gamut, for instance the subspace ab of the Lab space, etc. For the presented example, one deduces absolute linear XYZ$_{HDR}$ coordinates 1203 from the conversion formulas $$X=Y_0 x/y,\ Y=Y_0\ \text{and}\ Z=Y_0(1-x-y)/y.$$

The input color gamut described in the XYZ color space is transformed into its representation in the RGB color space using, e.g. depending on the input color image, a 3×3 transformation matrix for transforming the gamut from XYZ representation to RGB representation in accordance with ITU Rec.709 or ITU Rec.2020, respectively. Then, thanks to the transformation using BT709 or BT2020 3×3 matrix E 404 from XYZ to RGB, one gets the linear RGB$_{HDR}$ components that are used as the input of the LUV encoder 1210, 1220, 1230, as shown in FIG. 12:

$$\begin{bmatrix}R\\G\\B\end{bmatrix}=E\begin{bmatrix}X\\Y\\Z\end{bmatrix}$$

On the output side, the encoding 1210, 1220, 1230, here the LUV codec explained with reference to FIG. 9, provides L'U'V' 1205 corresponding to the standard YUV image displayed on a SDR display. This is changed back to gammatized R'G'B'$_{SDR}$ space 1206 by applying the inverse matrix A$^{-1}$ of the standard BT709/2020 RGB→YUV matrix defined by the ITU-R; and then back to the linear RGB$_{SDR}$ space by applying 1207 the gammatized-to-linear BT709/2020 EOTF. The coordinates in the gamut are determined by applying a transformation into the XYZ$_{SDR}$ space using the inverse 1208 of the matrix E used on the input side, and finally (x,y)$_{SDR}$ is found 1209 out by x=X/(X+Y+Z) and y=Y/(X+Y+Z).

Thus, the shown LUV generic codec defines a mapping $$\theta_{Ba,Y_0,a,b}(\beta',*):(x,y)_{HDR}\mapsto(x,y)_{SDR}$$

For fixed a,b, the minimization of the distance between the input and output couples (x,y) on the gamut determines a value of β" depending on (Ba,$Y_0$) or equivalently (Ba,$L_0$) as follows $$\beta''(Ba,L_0)=\mathrm{argmin}_{\beta''}\iint_{gamut}d_{xy}(\theta_{Ba,Y_0,a,b}(\beta'',(x,y)),(x,y))\,d(x,y)$$

where $d_{xy}$ is a chrominance distance defined on the gamut.

In the following, the construction of the domain of the integral and the distance $d_{xy}$ is shown. The gamut is defined by the (x,y) coordinates of the three primaries. For instance, the triangle of the BT709 gamut is the triangle with the three following vertices:

$$x_R=0.64,\ y_R=0.33,\ x_G=0.30,\ y_G=0.60\ \text{and}\ x_B=0.15,$$
$$y_B=0.06.$$

The color points inside the gamut G are defined as the positive weighted combination of the primaries, i.e. the convex hull of the three primaries.

$$(x,y)\in G \Leftrightarrow \exists\ \lambda,\mu,\nu\ge0$$
$$\text{s.t.}\ \lambda+\mu+\nu=1\ \text{and}\ (x,y)=(x_R,y_R)+\mu(x_G,y_G)+\nu(x_B,y_B)$$

Figure 13:
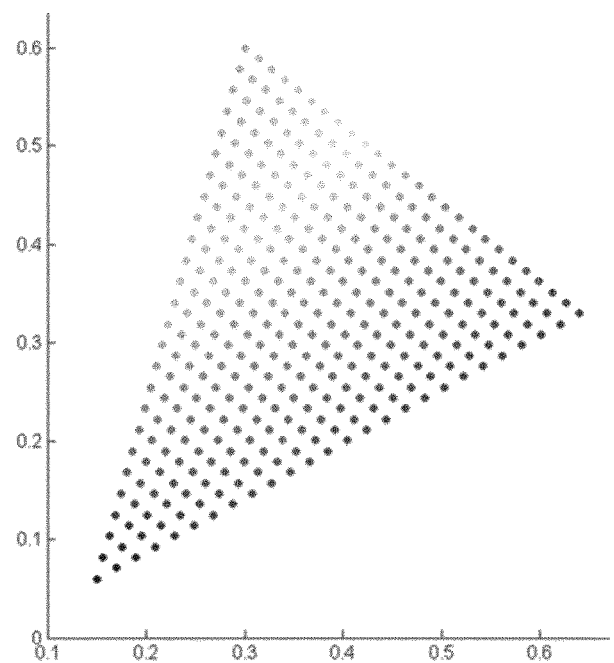
FIG. 13 illustrates a discretized gamut with uniform meshs.

The meshing of the gamut is performed by the meshing of the parameters (λ,μ) in the domain [0,1]$^2$ and a mesh is valid if and only if ν=1−λ−μ is positive. A uniform meshing on these two parameters leads to a gamut discretization as shown in FIG. 13.

Figure 14:
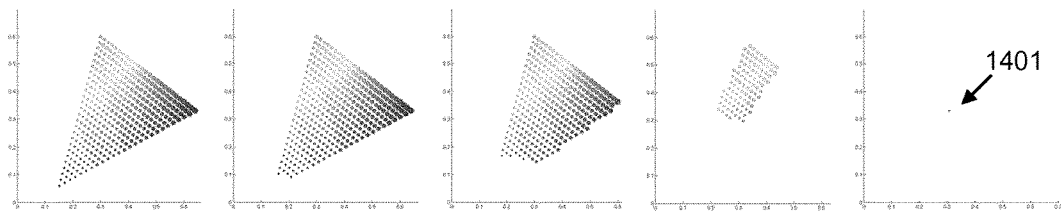
FIG. 14 illustrates a set of discretized gamuts for various values of $Y_O$.

The gamut closure is determined by discarding xy meshes for which, given by $Y_0$, a component of its linear RGB representation exceeds the peak luminance P. The remaining gamut is shown in FIG. 14 for various values of $Y_0$. Only the white point 601 remains near the peak $Y_0$=P.

However, this uniform meshing in the xy space does not reflect the sensitivity of human beings to colors. Ideally, one would expect more meshes in sensible zones and less meshes where the color difference is much less perceived. In theory, one should map a uniform meshing from an Euclidian perceptual color space onto the xy space. This is achieved by using the Lab color space and replacing the mapped non-uniform meshing by weights on each mesh in the xy space.

Let us consider the function ω:(x,y)→(L,a,b) that maps a gamut point (x,y) to a Lab space point (L,a,b), in the shown example assuming that the luminance $Y_0$ is unity.

With X=x/y, Y=$Y_0$=1 and Z=(1−x−y)/y, the corresponding Lab space points are determined by L=116f(Y/$Y_f$), a=500(f(X/$Y_f$)−f(Y/$Y_f$)) and b=200(f(Y/$Y_f$)−f(Z/$Y_f$)), where $Y_f$ is an environmental luminance reference and f is the following non-linear transform $$f(t)=\begin{cases}t^{1/3} & \text{if } t>\left(\frac{6}{29}\right)^3\\ \frac{1}{3}\left(\frac{29}{3}\right)^2 t-\frac{4}{29} & \text{otherwise}\end{cases}$$

It can be seen that, Y and L being fixed, the luma component L plays no role and ω actually maps a 2D xy volume on a 2D ab volume. The change in volume is provided by the absolute value J(x,y):=|Jac(ω)| of the determinant of the Jacobian matrix Jac(ω) of ω defined by $$Jac(\omega)=\begin{bmatrix}\partial_x a & \partial_y a\\ \partial_x b & \partial_y b\end{bmatrix}.$$

The volume occupied by a xy mesh is proportional to J(x,y) in the uniform ab color space. So, the error of color coding at a point (x,y) is multiplied by J(x,y) in the Lab space. That is why the weighted distance is defined as $$d_{xy}:=J(x,y)d_{ab}$$

on the space xy to measure the color difference and where $d_{ab}$ is a distance on the uniform color space ab.

Figure 15:
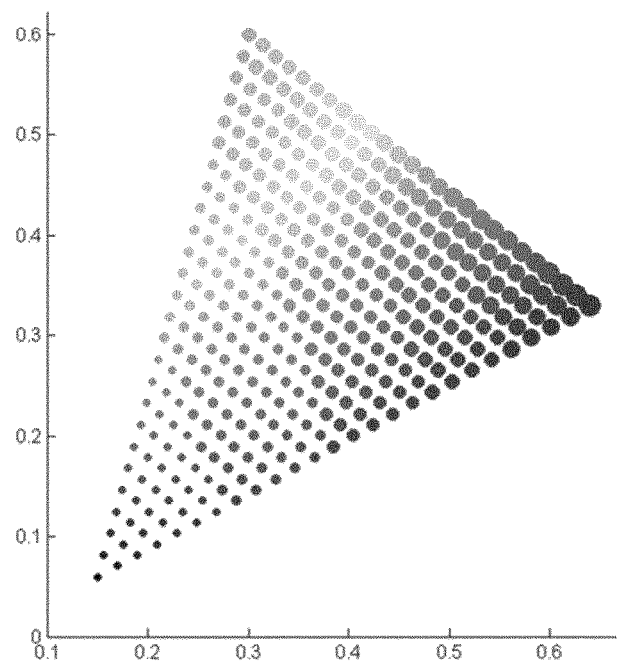
FIG. 15 illustrates a discretized gamut with weighted meshs.
Figure 16:
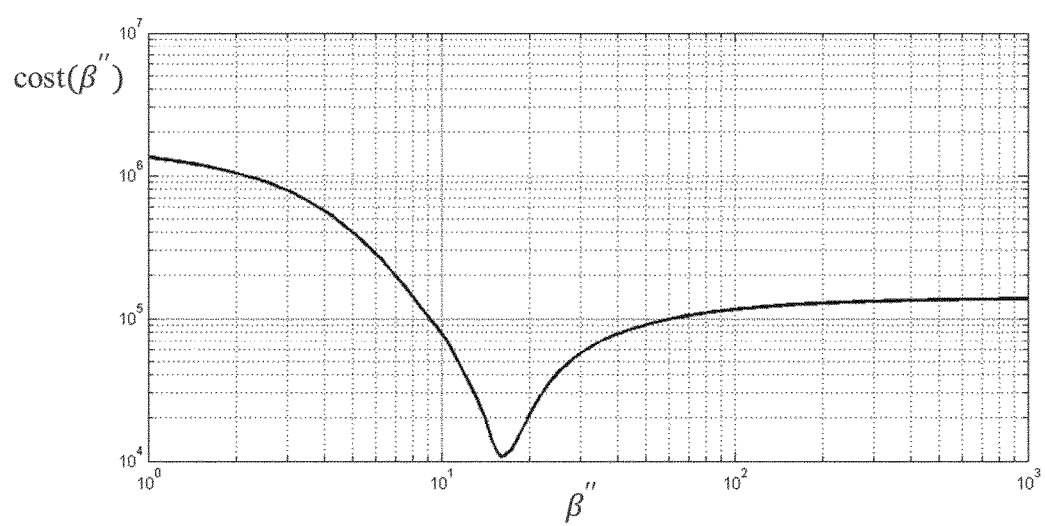
FIG. 16 schematically shows a plot of a cost function cost $(\beta'')$.

The weights of each mesh are illustrated in FIG. 15 where the radius of each dot is proportional to J(x,y). This emphasises the well-known fact that human beings are most sensitive to errors in red (corresponding to the rightmost section of the shown gamut triangle) than to errors in other colors.

Actually, weights as shown have been obtained by using a more elaborated Lab, see Lab 1994 and Lab 2000 formulas, than the one described above, with extra terms dealing with a lower sensitivity to high saturation and to more sensitivity to gray. The integral on the gamut should be understood as the sum on all meshes. This leads to the precise optimization problem $$\beta''_{opt}(Ba, L_0) = \operatorname{argmin}_{\beta''} \sum_{(x,y) \in mesh} J(x, y) d_{ab}(\theta_{Ba,Y_0,a,b}(\beta'', (x, y)), (x, y)).$$

given that the meshes are of uniform sizes in xy. Now we focus on a formula for $d_{ab}$.

There is a correlation between, on one hand, the lightness L and the non-normalized saturation (or so-called chroma)

$$C_{ab} := \sqrt{a^2 + b^2}$$

in the Lab space (It should be noted that the parameters a and b defining L' from L differ from a, b used for the Lab space) and, on the other hand, the perceived saturation of a color $S_{ab}$. It is somewhat accepted that the perceived saturation $S_{ab}$ follows more or less the ratio below between chroma and luma.

$$S_{ab} = C_{ab}/Y^{1/3}$$

The distance $d_{ab}$ is now constructed such that the perceived saturation $S_{ab}$ is preserved between HDR and SDR. Let us define the Lab mapping $$\Gamma:(x,y,Y_0,Y_f) \mapsto (a,b)$$

thanks to the formulas $$X = Y_0 x/y, \; Y = Y_0 \text{ and } Z = Y_0(1-x-y)/y$$

$$a = 500(f(X/Y_f) - f(Y/Y_f)) \text{ and } b = 200(f(Y/Y_f) - f(Z/Y_f))$$

Preserving the hue means keeping the ratio a vs. b, while also preserving the chroma $C_{ab}$ means keeping a and b. Alternatively, preserving the hue and perceived saturation $S_{ab}$ is achieved by keeping the two ratios $$a/Y^{1/3} \text{ and } b/Y^{1/3}.$$

That is why the following function is considered representative of the perceived saturation, namely the couple $(a/Y_0^{1/3}, b/Y_0^{1/3})$, $$\Xi_{Y_0}:(x,y) \mapsto \Gamma(x,y,Y_0,Y_0)$$

such that the transform $\theta_{Ba,Y_0}(\beta'',*)$ should be invariant under $\Xi_{Y_0}$ as the value $\beta''$ is constructed in order to preserve the perceived saturation. One may simplify the formula $\Xi_{Y_0}$ to get rid of the parameter $Y_0$.

$$\Xi(x,y) = (500(f(x/y)-1), 200(1-f((1-x-y)/y)))$$

For the described example, the norm $\| \; \|_2$ can be used because the Lab space is uniform Euclidian perceptual space. The index $L_0$ in $\Xi_{L_0}$ is understood as the use of the SDR luminance as environmental luminance reference, i.e. $Y_{SDR} = \mathrm{OETF}_{BT}^{-1}(L_0)$.

The optimal $\beta''$ preserving the saturation is obtained from the following minimization problem.

$$\beta''_{opt,sat}(Ba, L_0) = \operatorname{argmin}_{\beta''} \sum_{(x,y) \in mesh} J(x, y) \| \Xi \circ \theta_{Ba,Y_0,a,b}(\beta'', (x, y)) - \Xi(x, y) \|_2$$

$$= :\operatorname{argmin}_{\beta''} \operatorname{cost}(\beta'')$$

The optimal $\beta''_{opt,sat}$ is found through a systematic search in a suitable interval. For the example shown in FIG. 8, this search easily leads to a result, as the plot of the cost function $\operatorname{cost}(\beta'')$ proves it for the example parameters Ba=3.9, P=4000, $Y_0$=500, a=0.4799 and, b=0.4658.

Figure 17:
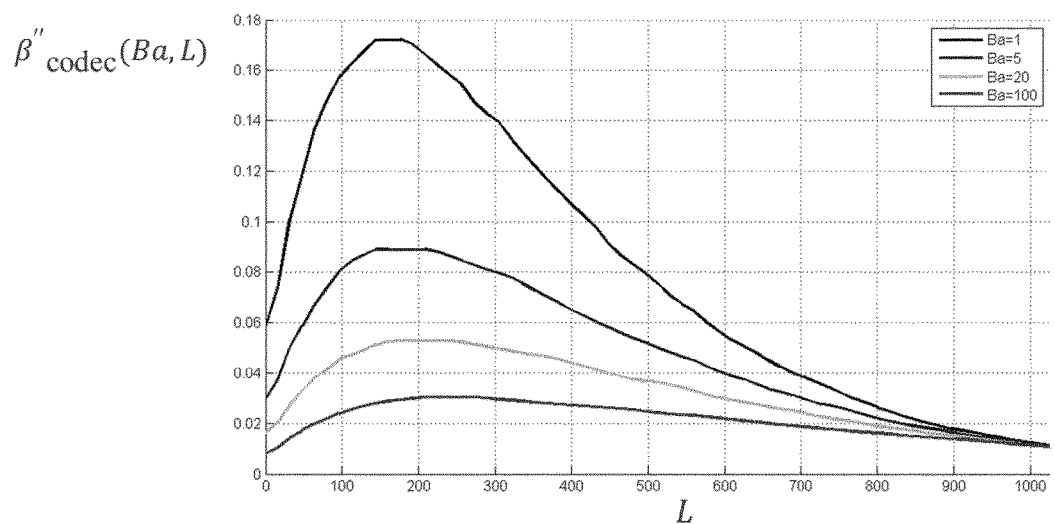
FIG. 17 schematically shows plots of cost functions cost $(\beta''_{codec}(Ba,L))$ for various values of Ba.

Finally, the value $\beta''=\beta''_{codec}$ used in the codec is adjusted from $\beta''_{opt,sat}$ up to a multiplicative constant (close to unity) to obtain a fine adjustment of the perceived saturation between LDR and HDR: $\beta''_{codec} \propto \beta''_{opt,sat}$ Referring to FIG. 17, the shape of $\beta''_{codec}$ can be found from the saturation optimization explained above. FIG. 17 shows a plot of $\beta''_{codec}(Ba,L)$ vs. L for the whole range L=[0,1024] for various values of Ba. It is clear that a LUT (look up table) for $\beta''_{codec}(Ba,*)$ can be easily interpolated from hard coded LUT for other values of Ba.

In FIGS. 9 to 13, the steps may also be considered as modules or functional units, which may or may not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively <<Application Specific Integrated Circuit>>, <<Field-Programmable Gate Array>>, <<Very Large Scale Integration>>, or from several integrated electronic components embedded in a device or from a blend of hardware and software components.

Figure 18:
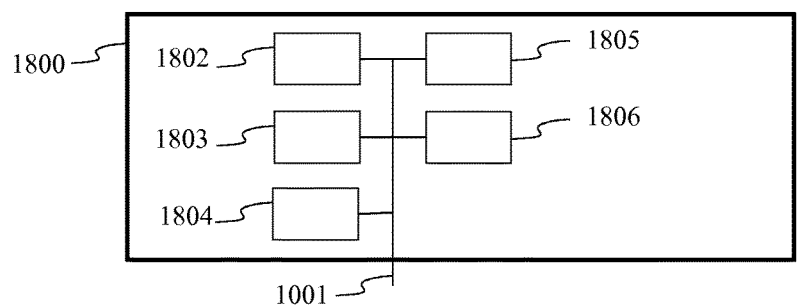
FIG. 18 shows an example of an architecture of a device in accordance with an embodiment of the disclosure.

FIG. 18 represents an exemplary architecture of a device 1000 which may be configured to implement a method described in relation with FIGS. 1 to 4.

Device 1800 comprises the following elements that are linked together by a data and address bus 1801:

- a microprocessor 1802 (or CPU), which is, for example, a DSP (or Digital Signal Processor);
- a ROM (or Read Only Memory) 1803;
- a RAM (or Random Access Memory) 1804;
- an I/O interface 1805 for transmission and/or reception of data, from an application; and
- a battery 1806.

According to a variant, the battery 1806 is external to the device. Each of these elements of FIG. 18 are well-known by those skilled in the art and will not be disclosed further. In each of mentioned memory, the word <<register>> used in the specification can correspond to area of small capacity (some bits) or to very large area (e.g. a whole program or large amount of received or decoded data). ROM 1803 comprises at least a program and parameters. Algorithm of the methods according to the disclosure is stored in the ROM

1803. When switched on, the CPU 1802 uploads the program in the RAM and executes the corresponding instructions.

RAM 1804 comprises, in a register, the program executed by the CPU 1802 and uploaded after switch on of the device 1800, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment, the color picture is obtained from a source. For example, the source belongs to a set comprising:
 a local memory (1803 or 1804), e.g. a video memory or a RAM (or Random Access Memory), a flash memory, a ROM (or Read Only Memory), a hard disk;
 a storage interface, e.g. an interface with a mass storage, a RAM, a flash memory, a ROM, an optical disc or a magnetic support;
 a communication interface (1805), e.g. a wireline interface (for example a bus interface, a wide area network interface, a local area network interface) or a wireless interface (such as a IEEE 802.11 interface or a Bluetooth® interface); and
 a picture capturing circuit (e.g. a sensor such as, for example, a CCD (or Charge-Coupled Device) or CMOS (or Complementary Metal-Oxide-Semiconductor)).

According to different embodiments, the picture is sent to a destination; specifically, the destination belongs to a set comprising:
 a local memory (1803 or 1804), e.g. a video memory or a RAM (or Random Access Memory), a flash memory, a ROM (or Read Only Memory), a hard disk;
 a storage interface, e.g. an interface with a mass storage, a RAM, a flash memory, a ROM, an optical disc or a magnetic support;
 a communication interface (1805), e.g. a wireline interface (for example a bus interface, a wide area network interface, a local area network interface) or a wireless interface (such as a IEEE 802.11 interface or a Bluetooth® interface); and
 a display.

According to different embodiments, a bitstream BF and/or F is obtained from a source. Exemplarily, the bitstream is read from a local memory, e.g. a video memory (1804), a RAM (1804), a ROM (1803), a flash memory (1803) or a hard disk (1803). In a variant, the bitstream is received from a storage interface, e.g. an interface with a mass storage, a RAM, a ROM, a flash memory, an optical disc or a magnetic support and/or received from a communication interface (1805), e.g. an interface to a point to point link, a bus, a point to multipoint link or a broadcast network.

According to different embodiments, device 1800 being configured to implement a method described in relation with FIGS. 9 to 13, belongs to a set comprising:
 a mobile device;
 a communication device;
 a game device;
 a set top box;
 a TV set;
 a tablet (or tablet computer);
 a laptop;
 a display and
 a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted.

The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of mapping colors from an input color gamut into an output color gamut, comprising a chroma scaling in which chroma components of colors are scaled by a chroma scaling factor $\beta''$, and a chroma mapping of said scaled chroma components, wherein said chroma scaling factor $\beta''$ is determined such as to minimize a sum of chrominance distances between colors of an input set distributed in said input color gamut and colors of an output set obtained by chroma mapping said colors of the input set using said chroma mapping.

2. The method of claim 1, wherein said chroma mapping is performed in a LUV color space.

3. The method of claim 1, wherein perceptual weights are associated with said colors of said input and output sets such that said chrominance distances of said sum are weighted by said perceptual weight.

4. The method of claim 1, wherein the perceived color error distance is based on the ab distance in the Lab colorspace.

5. A non-transitory computer readable storage medium having stored therein instructions to execute the step of the method according to claim 1 when this program is executed on a computer.

6. The method of claim 1, wherein the chroma scaling factor depends on a modulation value Ba representative of a brightness of a color picture to map, of a group of pictures (GOP) to map, or of a part of a color picture to map.

7. A non-transitory computer readable storage medium having stored therein instructions to execute the step of the method according to claim 6 when this program is executed on a computer.

8. The method of claim 1, wherein the input color gamut is defined as a finite set of points in the ClExy color space.

9. The method of claim 8, wherein said distribution is obtained through a uniform meshing in the ClExy color space.

10. The method of claim 1, wherein values of said chroma scaling factor are provided in a look up table with respect to values of the luminance component of the output color picture.

11. The method of claim 3, wherein, for different modulation values of the input color picture, dedicated look up tables or a combined look up table are provided.

12. The method of claim 11, wherein a desired multiplicative factor associated with a dedicated backlight value is either read from the look up table or determined by interpolation between corresponding multiplicative factors associated with neighboring backlight values.

13. The method of claim 1, wherein said mapping further comprises a tone mapping or an inverse tone mapping luminance component of said colors.

14. The method of claim 13, wherein said tone mapping or an inverse tone mapping is non-linear in function of said luminance component.

15. A non-transitory computer readable storage medium having stored therein instructions to execute the step of the method according to claim 13 when this program is executed on a computer.

16. The method of claim 13, wherein the chroma scaling factor of a color depends on the luminance component of said color.

17. A non-transitory computer readable storage medium having stored therein instructions to execute the step of the method according to claim 16 when this program is executed on a computer.

18. A device for mapping colors from an input color gamut into an output color gamut, comprising at least one processor configured to:
chroma scale chroma components of colors by a chroma scaling factor $\beta''$, and
chroma map said scaled chroma components,
wherein said chroma scaling factor $\beta''$ is determined such as to minimize a sum of chrominance distances between colors of an input set distributed in said input color gamut and colors of an output set obtained by chroma mapping said colors of the input set using said chroma mapping.

19. The device of claim 18, wherein values of said chroma scaling factor are provided in a look up table with respect to values of the luminance component of the output color picture.

20. The device of claim 19, wherein, for different modulation values of the input color picture, dedicated look up tables or a combined look up table are provided.

21. The device of claim 20, wherein a desired multiplicative factor associated with a dedicated backlight value is either read from the look up table or determined by interpolation between corresponding multiplicative factors associated with neighboring backlight values.

22. The device of claim 18, wherein said at least one processor is further configured to tone map or inverse tone map luminance component of said colors.

23. The device of claim 22, wherein said tone mapping or an inverse tone mapping is non-linear in function of said luminance component.

24. The device of claim 23, wherein the chroma scaling factor of a color depends on the luminance component of said color.

25. The device of claim 23, wherein the chroma scaling factor depends on a modulation value Ba representative of a brightness of a color picture to map, of a group of pictures (GOP) to map, or of a part of a color picture to map.

* * * * *

UNITED STATES PATENT AND TRADEMARK OFFICE
CERTIFICATE OF CORRECTION

PATENT NO. : 10,666,990 B2
APPLICATION NO. : 15/546646
DATED : May 26, 2020
INVENTOR(S) : Sebastien Lasserre, Fabrice Leleannec and David Touze It is certified that error appears in the above-identified patent and that said Letters Patent is hereby corrected as shown below:

In the Claims

At Column 22, Line 5, Claim 11, replace "3," with --10--

Signed and Sealed this
Nineteenth Day of November, 2024

Katherine Kelly Vidal
*Director of the United States Patent and Trademark Office*